United States Patent

Fickenscher

[15] 3,679,874

[45] July 25, 1972

[54] AUTOMATIC BAGGAGE HANDLING SYSTEM

[72] Inventor: William E. Fickenscher, Baltimore, Md.

[73] Assignee: The Bendix Corporation

[22] Filed: July 6, 1970

[21] Appl. No.: 60,992

Related U.S. Application Data

[62] Division of Ser. No. 735,132, June 6, 1968.

[52] U.S. Cl. ....................235/61.7 R, 235/61.11 E

[51] Int. Cl. ....................G06k 7/00

[58] Field of Search ....................104/88; 340/147; 186/1, 7; 235/61.6, 61.7; 340/152

[56] References Cited

UNITED STATES PATENTS

| | | | |
|---|---|---|---|
| 3,206,728 | 9/1965 | Baumgart et al. | 340/365 |
| 3,214,003 | 10/1965 | Wilson | 104/88 |
| 3,318,260 | 5/1967 | Gillespie | 104/88 |
| 3,403,634 | 10/1968 | Growder | 104/88 |

*Primary Examiner*—Daryl W. Cook
*Attorney*—Plante, Arens, Hartz and O'Brien, Bruce L. Lamb and William G. Christoforo

[57] ABSTRACT

An automatic baggage handling system utilizing individually powered baggage carts designed to carry luggage or other material at airports, railroad stations, and the like. Baggage handling information is converted into an electrical binary train of bits prepared by an optical ticket reader which scans a precoded, specially prepared baggage ticket and converts the data thereon into binary form. Baggage associated with the particular baggage ticket is loaded on to the baggage cart and a low power transmitter transfers the digital data to an escort memory in the form of a transceiver on the baggage cart. The loaded self-propelled baggage cart then moves along a track, with its escort memory being read by track readers located at critical, switching portions of the track, the track being switched in response to information contained in the baggage cart escort memory so that the baggage cart is transported expeditiously to a predetermined point on the track which may be a final destination or an intermediate holding area. Means are also provided for changing the information contained in the escort memory of identified carts in the holding area so as to encode a message therein identifying the desired final destination of the cart. The cart is then released from the holding area and delivered to the desired final destination, the aforementioned track readers reading the escort memory and switching the track in accordance with the information read.

3 Claims, 10 Drawing Figures

PATENTED JUL 25 1972 3,679,874

SHEET 1 OF 8

PROGRAMMABLE TRACK READER

AUTOMATIC BAGGAGE HANDLING SYSTEM

This is a division of application Ser. No. 735,132, filed June 6, 1968.

CROSS REFERENCES TO RELATED APPLICATIONS

Access to the automatic baggage handling system disclosed herein is suitably made through the optical reader and optical to electrical encoding means disclosed in Pat. application Ser. No. 724,855 for "Optical Ticket Reader and Encoding Means" by Fickenscher et al., filed Apr. 29, 1968, and which is owned by the assignee of this application.

BACKGROUND OF THE INVENTION

This invention relates to material handling systems and more particularly to a material handling system utilizing carriers having escort memories such as might be adaptable to handling baggage at a passenger terminal.

The increased use of passenger services offered by the common carriers, especially the airline industry, has made the use of automatic baggage handling equipment at passenger terminals particularly attractive in order to improve customer service, shorten connecting time between transfers, and to reduce baggage handling costs. It is desirable that luggage be handled individually for each passenger, as far as possible, thus any automatic baggage handling system should be built around individual baggage carriers which would have the capacity, in normal operation, of transporting up to three pieces of luggage.

It is also desirable that an automatic baggage handling system be controlled by the individual passenger, with the passenger having access to the baggage handling system at various decentralized locations strategically located throughout the passenger terminal. In essence, the baggage handling system should be a self-service device.

BRIEF SUMMARY OF THE INVENTION

Accordingly, a communications and data processing system has been devised for use as an escort memory and control system for linear motor powered, automatic baggage handling carts. In this system, luggage is placed in track guided individual carriers, or carts, with the cart's operation directed by stators and switches in the track. A cart escort memory is encoded with all the necessary data to route the cart to its proper destination. The cart communicates this data to ground stations located at various points along the track, with these ground stations staggering the necessary circuits for controlling the carts. This control function could readily be performed by a central controller, however, due to the catastrophic results of a malfunction in the controller, a decentralized system, where interruptions to service are localized, is preferred.

Suitably, a specially designed baggage ticket which contains information as to the baggage claim number, passenger destination, transfers, carrier, and flight number is passed over an optical ticket reader, which reads the pertinent information on the ticket, encodes it and transmits it to the escort memory on the baggage cart via an extremely low powered radio link. An optical ticket reader, specially designed baggage ticket and encoder is disclosed in the patent application "Optical Ticket Reader and Encoding Means," Ser. No. 724,855 previously referenced and the teachings therein are hereby included herein. When necessary, all or part of the message in the escort memory may be changed, even while the cart is in motion, on command by a ground station.

An individual track reader, which typically is located at a strategic point along the track, retains in a reader memory information for which it is to look. The track reader reads the escort memory of any baggage cart in its vicinity, and initiates a switching action on the track if the data in the escort memory agrees with information in the memory of the track reader. In an actual system, some readers will have a particular message part in which they are interested. For example, at an airport, the reader at the entrance to a certain airline terminal will only check the part of the message containing the carrier identification, switching its airline's identified baggage carts in, and allowing all others to pass. Additionally, the same reader can at different times be used to separate carts by destination, flight, or baggage claim number. In this manner, luggage for a flight that has not yet been called can be segregated into a holding area, and then delivered automatically to the flight line when the flight is called.

Upon arrival of a flight at a terminal, luggage is off loaded from the aircraft and loaded on the baggage carts. Baggage handling information suitably encoded on a baggage ticket which is read by an optical reader is transferred to the escort memory of the baggage cart in the manner described. The cart will then immediately move to a baggage recirculation area.

Baggage claim stations are located at strategic point throughout the terminal, such as in the parking lot or at the taxi stand. Each unloading station suitably includes a ticket reader into which an incoming passenger desiring his luggage places his ticket. The ticket is optically read with the information thereon being transmitted by ground wire to a master claim reader located at the baggage recirculation area. This reader locates the proper baggage cart, readdresses it with the claim station code identifying the claim station at which the passenger calling for his luggage is waiting and sends the cart to the passenger where the passenger may remove his luggage.

It is thus an object of this invention to provide an automatic baggage handling system access to which can be controlled by the passenger himself.

It is another object of this invention to provide an automatic baggage handling system in which individual self-propelled baggage carriers each carry all the information associated with its cargo.

It is still another object of this invention to provide a decentralized automatic baggage handling system to prevent carastrophic shut-down of the system.

It is still another object of this invention to provide an automatic baggage handling system having multiple loading and unloading stations.

Another object of this invention is to provide an automatic baggage handling system which will expedite transfer of baggage from one carrier to another during passenger transfers.

Yet another object of this invention is to provide an automatic baggage handling system which will decrease the costs of handling passenger baggage at passenger terminals.

A further object of this invention is to provide means for verifying the accuracy of messages transmitted between the various elements of the baggage handling system.

DESCRIPTION OF THE PREFERRED EMBODIMENT

This description will concern itself with an automatic baggage handling system such as would be located in an airplane terminal. However, it should be understood that this baggage handling system could be used at any passenger terminal and where large amounts of baggage are handled. It should also be obvious that this system and the escort memory used therein are adaptable for use in other types of material handling situations.

One type of cart suitable for use in a baggage handling system of the type to be described is a cart driven by a linear induction motor. This type of cart rides on a track and is propelled by magnetic forces generated in a ground mounted stator generally located between the tracks, the magnetic forces acting on a cart mounted armature. The stator is not electrically hot which makes this propellant means particularly attractive for use in passenger terminals. Additionally, there are no physical connections between the armature and the stator so that a cart may be stopped merely by throwing a barrier across the track. Other types of propelling means, although not quite as suitable, can also be used, such as, for example, carts having integral motors powered from a third rail or carts which are pulled along in the manner of a cable car.

Figure 1:
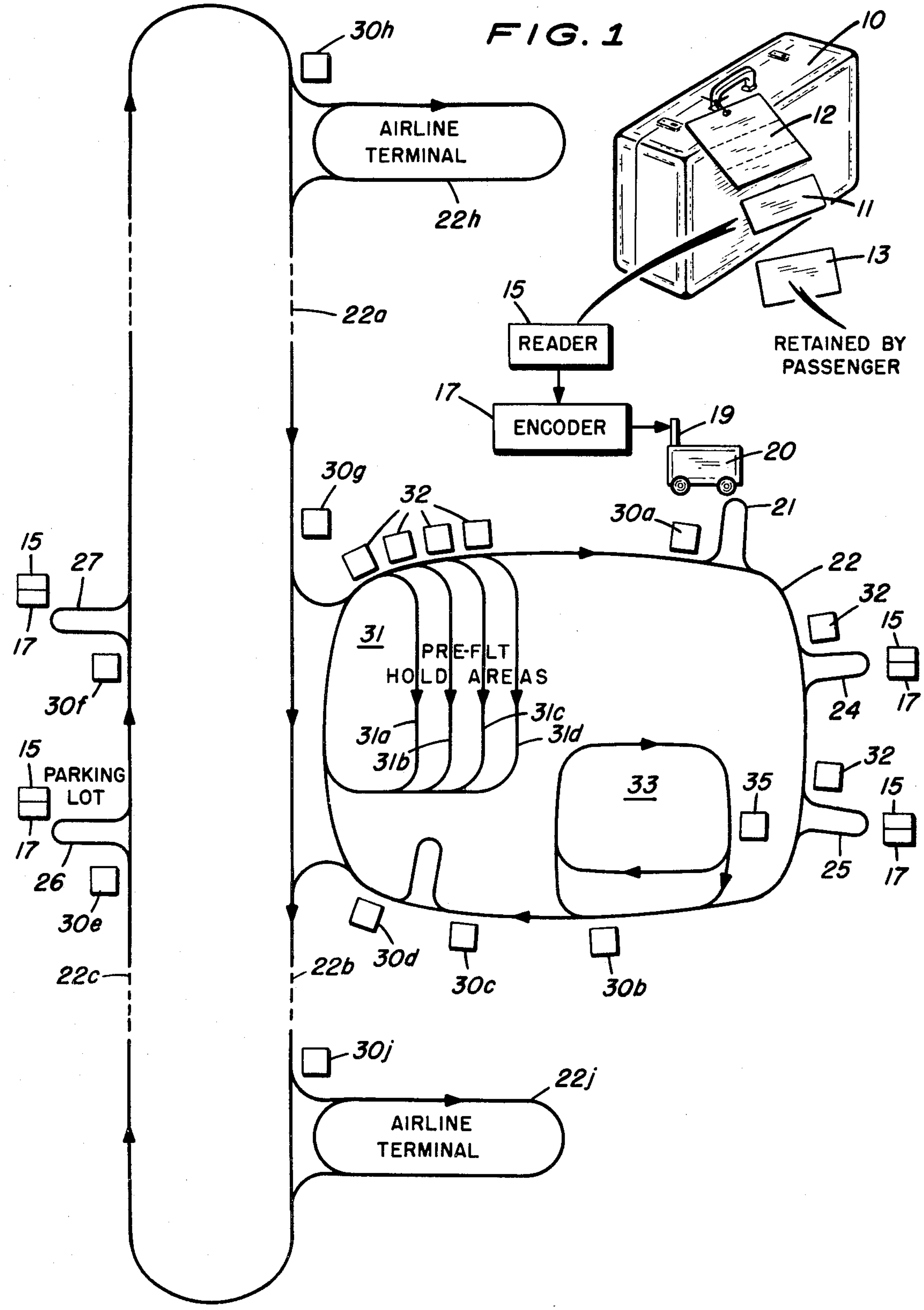
FIG. 1 is a stylized layout of a typical automatic baggage handling system.

First refer to FIG. 1, which is a stylized layout of an automatic baggage handling system. On arrival at the originating terminal, the passenger has a segmented baggage ticket filled out to include thereon information as to his entire itinerary as well as a baggage claim number, this information comprising baggage handling information. This ticket could be marked by agents at the ticket counter or by attendants in various parts of the terminal. The bottom segment of the ticket 13 is detached and retained by the passenger as a record. The remainder of the ticket 12 is attached to the bag 10, the next segment 11 of the ticket removed and passed over the sensors of a ticket reader 15, details of which along with a suitable baggage ticket are disclosed in aforementioned Pat. application Ser. No. 724,855 and which is included herein by reference. The information contained in the ticket is digitized by an encoder which is part of the ticket reader to form a message including binary words for airline code, for destination, for flight number, and for baggage claim number. The location of the particular words in the message is ordered, so that the airline code, for instance, always occupies the same portion of the message. If no airline code were present on a particular ticket segment, that portion of the message would be coded all zeroes. The bag is placed in an empty cart (empty carts are routed to the loading stations) and the digital information contained in the encoder is transmitted to the escort memory 19 of the baggage cart 20 through transmitter 17. The transmitter also adds to the data received from the ticket reader a special code indicating the start of the message. This references the particular word positions.

Once the transmission is complete, the cart transmits the message back to the transmitter. The transmitter now checks the entire message and if an error is detected, another transmission is made. Once the return message has been found to be correct, the transmitter activates a relay which releases a track brake which has been holding the baggage cart, thereby causing the cart to be propelled along spur 21 and onto track 22. The cart transmits the message retained in its escort memory continuously as it travels along the track at a rate such that any reader along the route will receive the message at least four times as it is passed.

The track typically consists of at least one airline terminal loop 22 with access to and from this loop and other terminal loops via track segments 22*a*, 22*b* and 22*c*. A typical airline terminal loop 22 includes holding areas 31 which are used as main holding areas and a sub-loop 33 which is used as a baggage recirculation area. Additionally, there are a number of smaller loops for passenger access to the system, such as loops 26 and 27. Loops 24 and 25 are located on the flight line and are used by aircraft loading and unloading personnel for access to the baggage handling system while loop 21 is located, for example, at a ticket counter.

At each switch point on the track there is located either a track reader 30-which includes a fixed memory or a track reader 32 which includes a memory which is programmable from a remote location. One exception to this is the master claim reader 35 located at the exit from the baggage recirculation area 33 and the function of which will be described below. Generally, a track reader retains in its memory the information for which it is to look. The track reader is always enabled and upon receipt of a start of message code from a baggage cart passing in its close proximity, it compares the received data with stored data and initiates the switching action of the track switch if the received data agrees with the data retained in the track reader memory.

Assuming now that a baggage cart leaving loop 21 is scheduled for a flight which has been called line position 25, track reader 32 at flight position 25 will have been set to recognize the proper coding in the flight number portion of the information stored in the escort memory. As the baggage cart approaches, the reader recognizes from the escort memory the flight number and allows the baggage cart to proceed into loop 25, where airline personnel unload the baggage from the cart and load it into the waiting aircraft. The escort memory is then wiped clean and the empty cart proceeds back to one of the loading areas 21, 26 or 27, or if needed for incoming flights, to flight position 24.

Loaded baggage carts for flights not yet called move along track 22 and into hold area 31 where one of programmable track readers 32 has been set to recognize the flight number. The cart thus moves into one of the holding spurs 31*a*, 31*b*, 31*c* or 31*d*, each of which retains the baggage for one particular flight. A brake in the spur holds the carts until the flight is called at which time the brake is released and the baggage carts move to the proper flight line position 24 or 25.

Sub-loops 26 and 27 which are located at remote parts of the terminal, such as in the parking lot or at a taxi stand, are also suitably equipped with optical ticket readers. A ticketed passenger arriving at one of these remote locations may load his baggage on to a waiting empty baggage cart and pass his baggage ticket over the optical ticket reader. The loaded baggage cart will then proceed as before either to the proper position on the flight line if the flight has been called or into one of the holding spurs 31*a*, 31*b*, 31*c* or 31*d*.

It will be remembered that airline terminal loop 22 is one of a possible plurality of airline terminal loops located at the airport. Thus, track readers 30*d* and 30*g* are set to recognize the code information of the airline operating out of this terminal. In like manner, readers 30*h* and 30*j* are set to recognize the code of airlines operating out of terminals 22*h* and 22*j* respectively. In this manner, baggage in the proper terminal loop will remain in that loop while baggage not in the proper terminal loop will be automatically transported to the proper loop. Although, for simplicity, only terminal 22 has been shown in detail, it should be understood that terminals 22*h* and 22*j* are similar thereto.

At the termination of any leg of a trip, when the baggage is removed from the aircraft, the next segment of the ticket is detached and read in another optical ticket reader. The baggage is then loaded on to a baggage cart and the data encoded into the cart's escort memory. Thus the baggage cart now contains all the information required for the next leg of the flight. This last mentioned operation might occur when an incoming flight arrives at flight line area 24 or 25. The loaded baggage cart moves into holding loop 31 where it awaits the flight call of the next leg of the trip in the manner previously described.

If the incoming flight is the termination of the trip the baggage cart moves into baggage claim recirculation area 33. The passenger may now call for his baggage at loop 26 or 27 by placing his segment of the ticket in the ticket reader located at these loops. The information read from this segment of the ticket is transmitted by land line to master claim reader 35 which selects the proper baggage cart and encodes into the cart's memory information as to the desired destination of the cart. In this manner, the passenger may call for his baggage unaided at any conveniently located pickup area.

Figure 2:
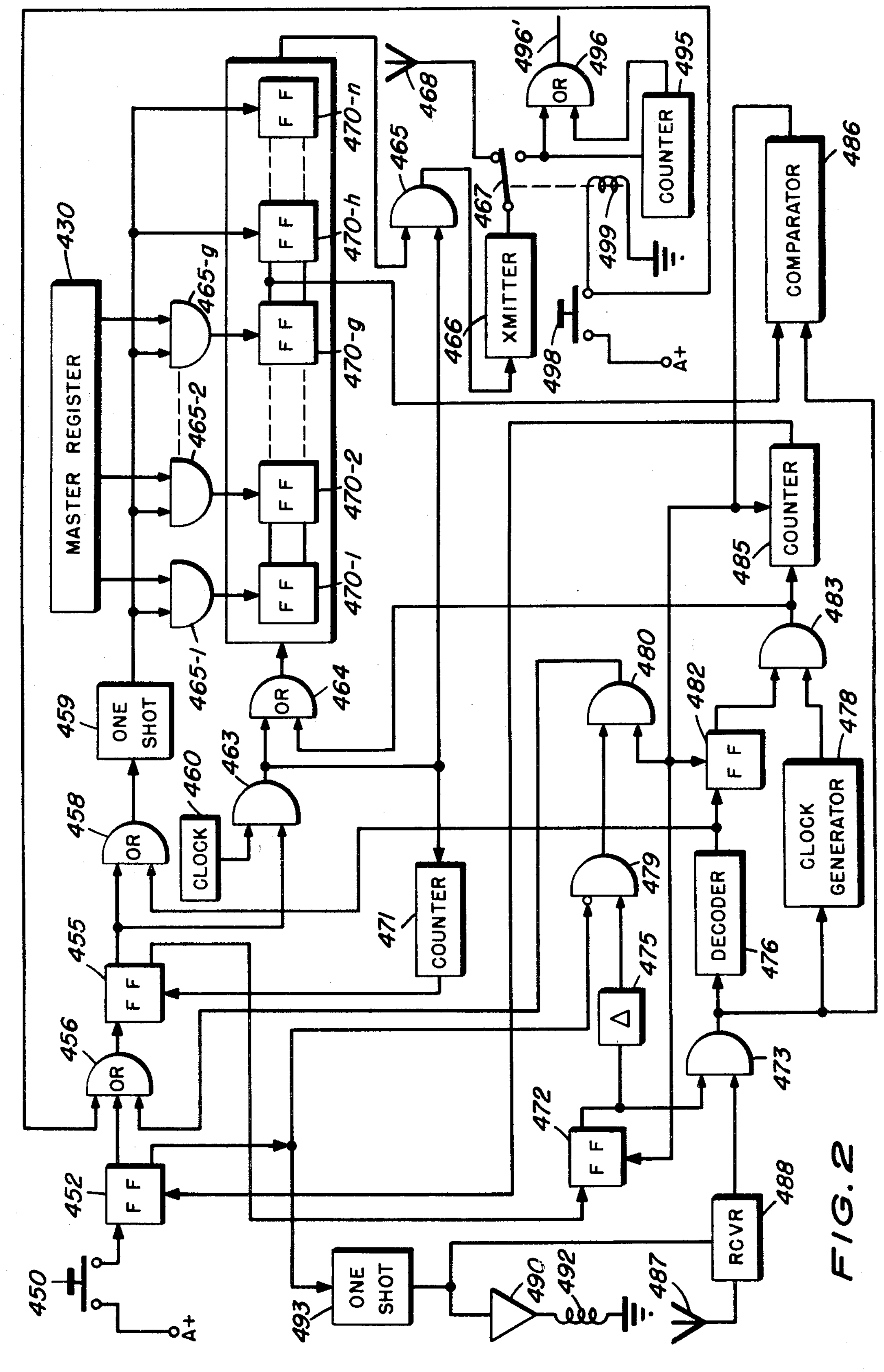
FIG. 2 is a block diagram of means for transmitting a baggage handling system message either via a radio link or a ground wire and for verifying the transmission.

Referring now to FIG. 2, a baggage handling message is stored in master register 430 in a serial binary bit train. Master register 430 may be encoded in any one of the known ways or it can be encoded more suitably by the optical reader and encoder described in Pat. application Ser. No. 724,855, which has been previously mentioned. Briefly, the aforementioned optical reader and encoder include a plurality of optical sensors each of which is comprised of a fiber optics bundle partially split longitudinally into two legs and a trunk. The trunk end of the various sensors comprise discontinuities to light passage from one sensor leg to the other. The discontinuities are arranged on a flat surface across which a specially prepared baggage ticket is passed. Indicia, the spacing of which on the ticket encodes the baggage handling message, alternately bridge and unbridge the sensor discontinuities to light passage, one leg of each sensor being illuminated by a lamp and the other leg of the sensor illuminating a photosensitive cell when the sensor's discontinuity is bridged. A sensor circuit which contains a sensor illuminated photosensitive cell, converts the optical information into binary electrical signals. These binary signals are stored in shift registers in accordance with steering directions derived from key indicia on the baggage ticket. The stored signals are then encoded in master register 430 in the serial binary bit form desired.

Returning to FIG. 2, a switch closure 450, which may be manually operated by the ticket reader operator, but which more suitably is automatically operated upon satisfactory entrance of a baggage handling message into master register 430, is closed thus placing flip-flop 452, which had been in the reset state as will be later explained, in the set state. The resulting signal passes through OR gate 456 and triggers flip-flop 455 into the set state also, which set state signal triggers one shot 459 through OR gate 458. The one shot output pulse qualifies gates 465-*l* to 465-*g*, thereby causing the information encoded in master register 430 to be additionally encoded in shift register 470 which is comprised of flip-flops 470-*l* to 470-*n*. It will be noted that the seven flip-flops 470-*h* to 470-*n* receive no information from master register 430, but receive the one shot 459 output pulse directly. A start of message signal comprised of seven consecutive signal "1"s thus precedes the regular baggage ticket message. This start of message format uniquely identifies the start of the message. The set signal from flip-flop 456 also opens clock gate 463 and allows the clock pulses generated by free-running clock 460 to pass through gates 463 and 464 so as to strobe shift register 470, the message contained therein thus passing through AND gate 465, which has been qualified by the same strobing signals passing through gate 463. The message is modulated and amplified in transmitter 466, conveyed through normally closed relays contacts 467 and transmitted by antenna 468 via a radio link to a receiving antenna on the baggage cart. The message is entered into a recirculating memory on the cart which also continually transmits any message being circulated therein.

The clock pulses are also applied to counter 471 which has been preset to count to the member corresponding to the number of clock pulses which must be applied to register 470 to cause it to discharge its message completely. At the completion of the message transmittal as determined by counter 471 a counter signal resets flip-flop 455. This flip-flop reset signal sets flip-flop 472 which thereby qualifies AND gate 473. It will be remembered that any message retained in the cart memory is continually circulated and transmitted, thus the baggage ticket message now in the cart memory will be transmitted from the cart and will be received at receiving antenna 487 and receiver 488, which demodulates the message and applies it through gate 473 to the start of message decoder 476. This decoder searches for the unique start of message word and may suitably comprise a three stage counter and a gate as will be shown later. Upon receipt of the start of message word a decoder signal sets flip-flop 482 which thus qualifies AND gate 483. Receipt of the message has also triggered clock 478 which generates clock pulses which pass through qualified gate 483 and OR gate 464 so as to strobe shift register 470. The start of message decoder output signal has also been applied through gate 458 to trigger one shot 459 thus causing the baggage ticket message which has been retained in master shift register 430 to be once again reproduced in register 470. The received message is applied to the comparison circuit 486 where it is compared with the message now moving out of register 470. The messages are compared bit by bit with an error signal being generated when two bits are not identical. This error signal is applied to reset counter 485 and flip-flops 472 and 482, thereby closing gate 483. It will be noted that the set state of flip-flop 472 has triggered a long delay 475 which qualifies gates 479 and 480. The error signal can thus pass through gate 480 and OR gate 456 so as to trigger flip-flop 455 into the set state. When flip-flop 455 assumes the set state the circuitry once again repeats the procedure just described so as to transmit again the baggage ticket message to the baggage cart.

If the baggage ticket message is transmitted from the baggage cart and compared with the message contained in the master shift register 430 so that no error signal results, an end of message signal from counter 485 is applied to reset flip-flop 452 thus completing the encoding of the baggage cart. When flip-flop 452 is reset it triggers one shot 493, the output of which is amplified in amplifier 490 for use by brake winding 492 to release the brake holding the baggage cart. The flip-flop 452 reset signal also disables receiver 488 and AND gate 479 thus effectively 15 returning the transmitter to a standby condition.

It is also possible with this transmitter to automatically transmit the binary train encoded in master register 430 via a land line. It is also possible, whether the message is sent via a land line or a radio link, to encode into the message information identifying the location from which the message is sent. For convenience this latter feature of the invention will be explained in conjunction with the explanation of how the binary train is sent via a land line, however, this description should make it obvious that the transmission location code can be inserted into the binary train when the binary train is transmitted via an air link.

The manner in which the binary train is transmitted via a ground wire with the addition of a code word identifying the location from which the message is transmitted is accomplished as follows. The passenger upon arriving at his final destination wants to retrieve his baggage from the recirculation area 33 of FIG. 1 to which his baggage has been sent as previously explained. He thus places the ticket segment which he has retained, which in this example is ticket segment 13, into an optical reader located at access area. The information encoded on the ticket is read in the conventional manner, as described, and stored in master register 430. The passenger then depresses switch 498 to energize relay coil 499 so as to switch relay contacts 467. A + voltage is also applied through OR gate 456 to the set terminal of flip-flop 455, thereby causing the message in master register 430 to be shifted into register 470 and strobed out through AND gate 465. The message stored in master shift register 430 cannot now be transmitted over antenna 468, but instead will be transmitted through OR gate 496 via a ground wire 496'. In addition to being transmitted via the ground wire, the message is also applied to counter 495 which counts the message bits received. For the particular ticket segment information now being transmitted (segment 13, as seen in FIG. 1) only the start of message, the airline and claim number portions of the message need be occupied, thus all other portions of the message, that is, the flight number and destination portions, contain all zeros. Counter 495 is programmed to transmit through gate 496 a unique binary bit word which identifies the access area in which this optical reader is located, simultaneously with the transmission of the carrier identification portion of the message. Since the carrier identification word consists of all zeros, the access area identifying word will preempt the carrier word.

At the completion of the ground wire transmitted message, as determined in the manner described by counter 471, an end of message signal is generated thereby which resets flip-flop 455.

Figure 3:
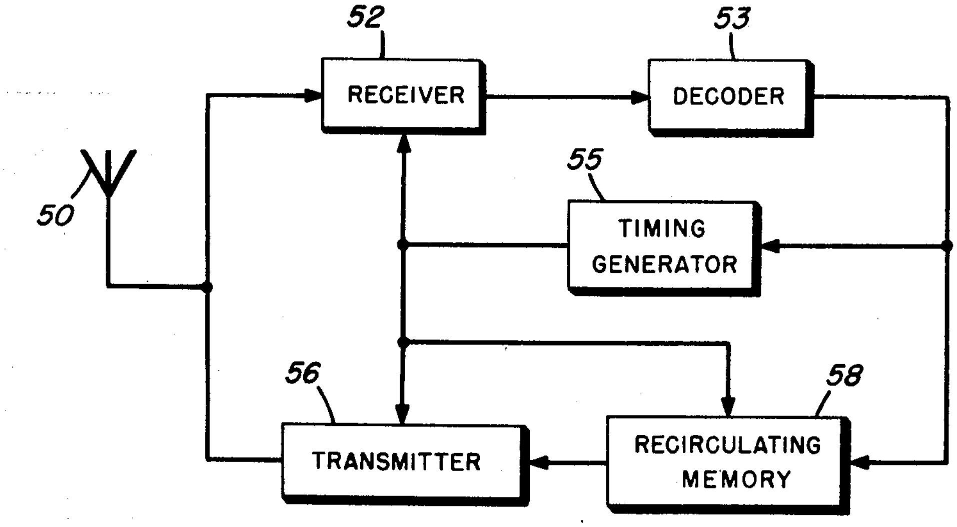
FIG. 3 is a simplified block diagram of a baggage cart escort memory.

Referring now to FIG. 3 which is a simplified block diagram of the cart escort memory, an antenna 50 is time shared by a receiver 52 and a transmitter 56 according to timing signals internally generated by timing generator 55. While in the receive mode, signals received on the antenna and demodulated in the receiver are applied to the decoder 53. The decoder searches for the start of message word. If this word is not received no change will take place in the escort memory and after a certain interval of time which is determined by the timing generator, the escort memory reverts to the transmit mode for an additional interval of time. If, however, a start of message word is received, all of the ensuing data is gated into recirculating memory 58 and the old data previously stored therein is discarded. After the new message has been stored, the unit returns to a normal operation of transmitting the complete message during each transmit period.

Figure 4:
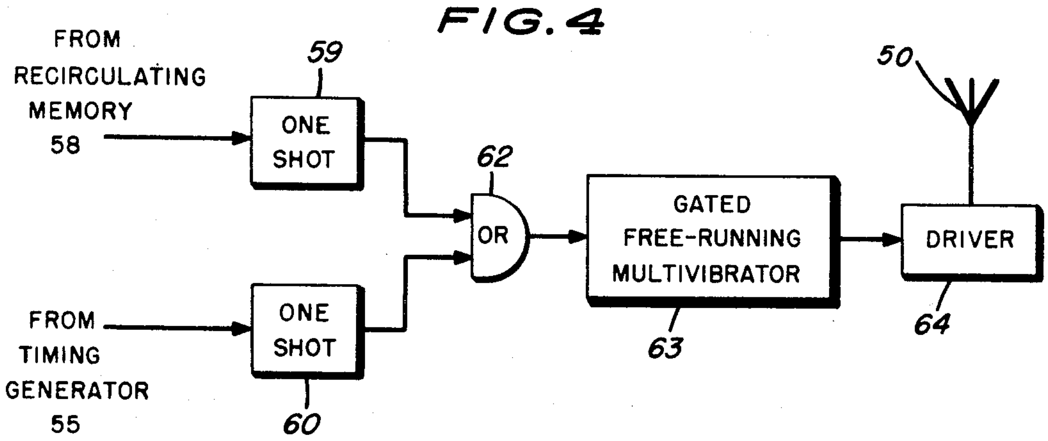
FIG. 4 is a block diagram showing a typical automatic baggage handling system transmitter as used in the escort memory.

FIG. 4 is a simplified block diagram of transmitter 56 with antenna 50 showing one shot 59 which has a relatively long period and one shot 60 which has a relatively short period. Information contained in recirculating memory 58 is applied directly to one shot 59 so that each digital "1" contained therein triggers the one shot to generate its normally long pulse. The timing generator 55 timing pulses which are applied to recirculating memory 58 are also applied to one shot 60 which in response thereto generates its characteristically short pulse. The output signals of both these one shots are applied through OR gate 62 to a gated free running multivibrator 63 which generates radio frequencies in accordance with enabling pulses received. It should now be obvious that when a digital "0" is being discharged from memory 58, one shot 59 is unenergized while one shot 60 is energized and that when a digital "1" is being discharged from the memory both one shot 59 and 60 will be energized. Since one shot 59 generates a longer output pulse, this output pulse will override the pulse generated by one shot 60. Multivibrator 63 frequency and the periods of one shots 59 and 60 have been arranged so that during the period of one shot 59 seven frequency excursions will be generated by the multivibrator, while for the period of one shot 60 three frequency excursions will be generated. The multivibrator outputs are amplified in driver 64 and transmitted from antenna 50.

Generally, the transmitter is a low power device while the receiver is very insensitive. This prevents the baggage sorting system from interfering with other electronic equipment in its vicinity. This is possible because the radio link from a ground station to the baggage cart antenna is only a few inches.

Figure 5:
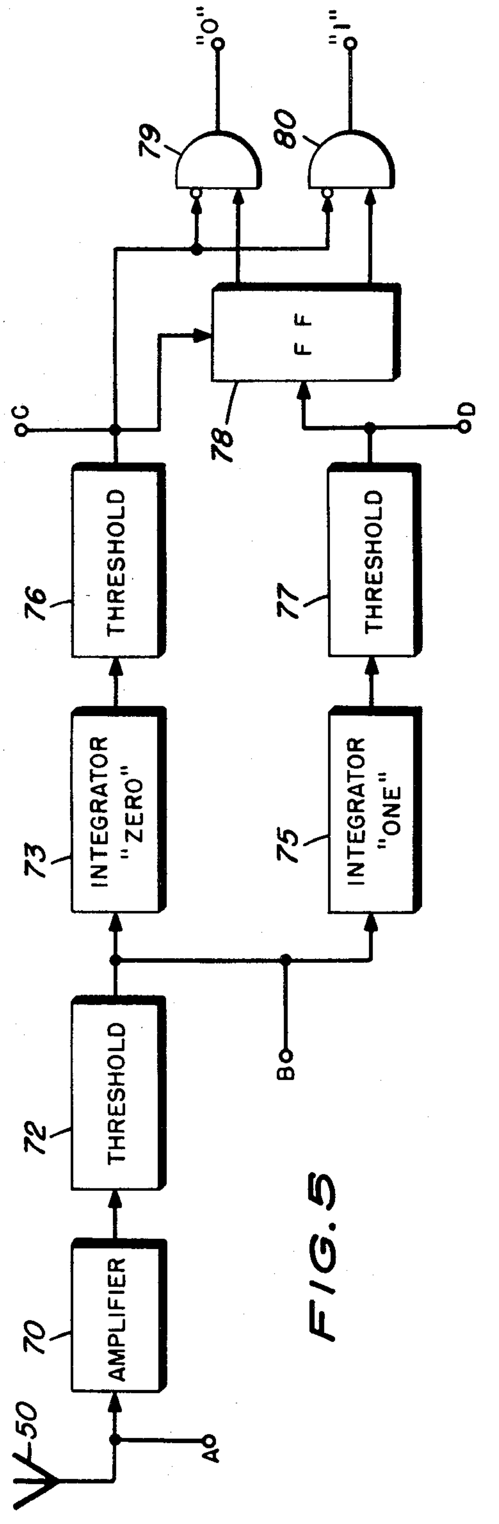
FIG. 5 is a block diagram showing a typical automatic baggage handling system receiver as used in the escort memory.
Figure 6:
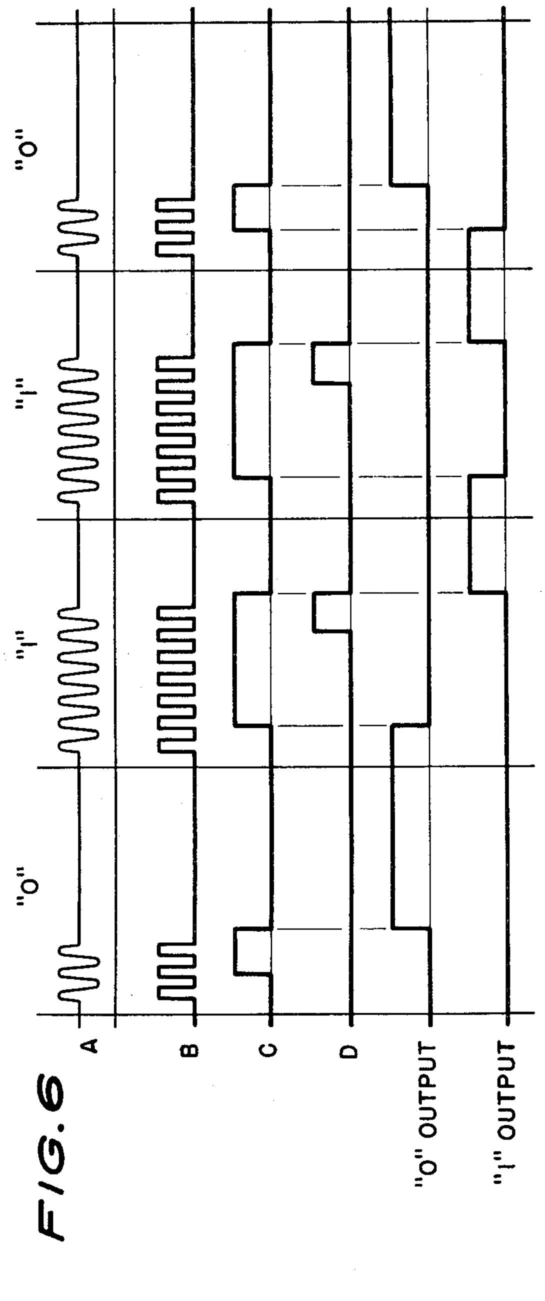
FIG. 6 is a plot of electrical waveforms in various parts of the receiver circuitry of FIG. 5.

FIG. 5 is a simplified block diagram of the receiver 52, while FIG. 6 is a plot of the signals at various points in the receiver circuitry with referenced plot lines comprising the signal appearing at like referenced terminals in FIG. 4. Reference should now be made to these two figures with the understanding that although the description of the automatic baggage handling system assumes that the binary messages exchanged via radio link between the various elements of the system are modulated in the manner to be described and that the receiver and transmitter described can thus be suitably used in the track readers yet to be described, other methods of modulation and types of hardware can also be used. Returning now to FIGS. 4 and 5, a message is received on antenna 50 (terminal A) which is seen to consist in part of the binary digits 0110 as shown in line A of FIG. 6. The "0"s are seen to consist of three complete frequency excursions, while "1"s consist of seven complete frequency excursions. These signals are applied to amplifier 70 and thence to threshold 72 which clips off the signal base line and digitizes the input data into a train of pulses, three for transmitted "0"s and seven for transmitted "1"s. This is shown at line B of FIG. 6. Because the antenna bandwidth is not infinite and thresholding never perfect and because of slight errors in the transmitter, there may be from two to four pulses for a "0" and from six to eight pulses for a "1." The pulses are applied to two integrator and threshold circuits comprised of integrator 73 and threshold 76, and integrator 75 and threshold 77, respectively. These are adjusted so that the "0" threshold 76 produces an output when two or more pulses occur successively and the "1" threshold 77 is exceeded when more than five pulses occur successively. The signal output of the integrator and threshold circuits appears at terminals C and D and is shown at lines C and D of FIG. 6. These outputs are then applied to flip-flop 78 as shown, with the "1" signal being applied to set the flip-flop and the "0" signal being applied to reset the flip-flip. As each pulse begins, the "0" output resets the flip-flop, where it remains unless the "1" output occurs. If the "1" output does occur, it overrides the "0" by settling the flip-flop. At the end of the pulse, the integrators discharge, removing the flip-flop inputs. At this time the flip-flop is read as a "1" or "0" by gates 79 or 80 when the inhibit signal generated by threshold 76 is removed therefrom.

Figure 7:
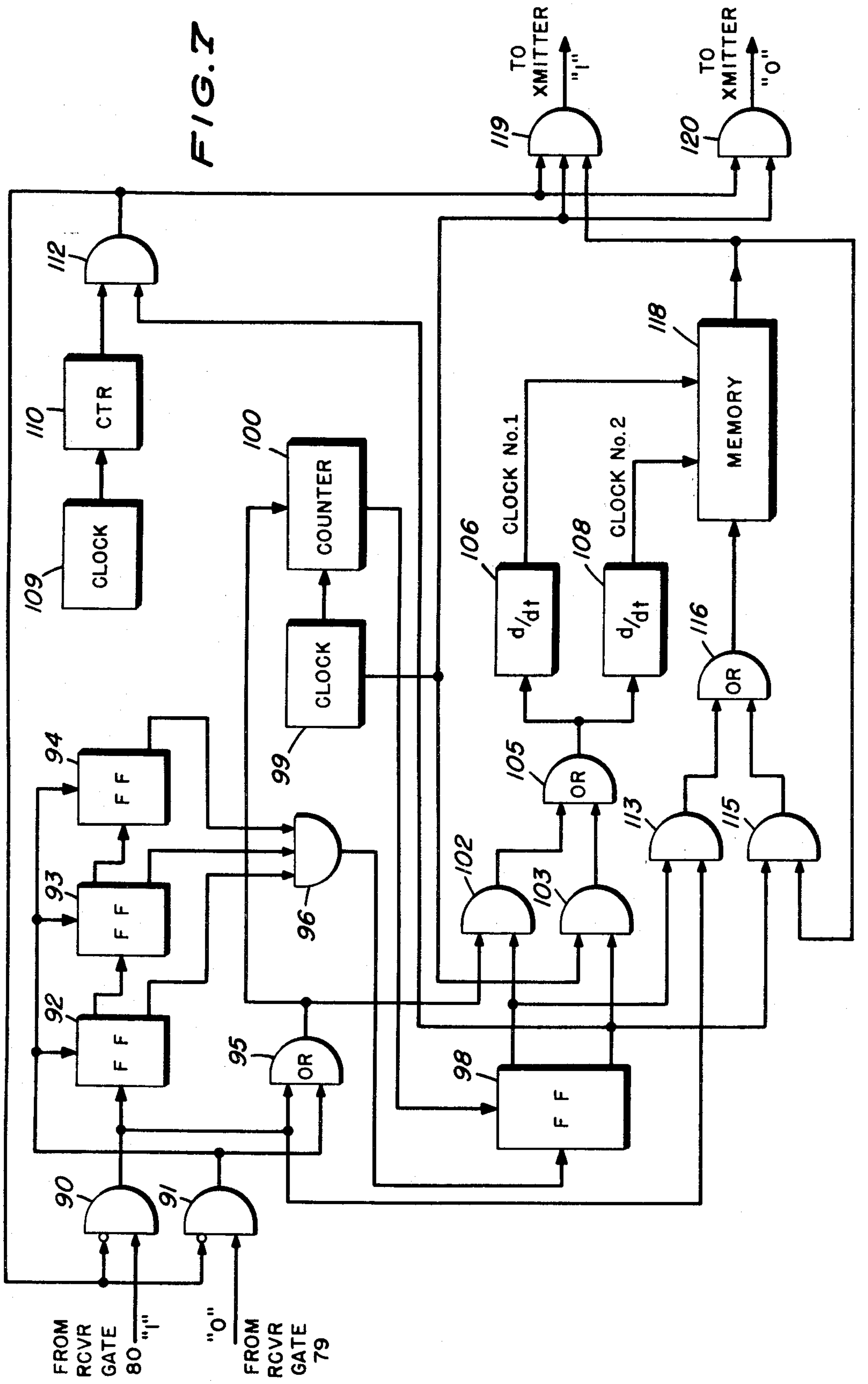
FIG. 7 is a block diagram showing in greater detail certain portions of the baggage cart escort memory.

Referring now to FIG. 7 which is a block diagram showing in greater detail the structure of decoder 53, timing generator 55 and recirculating memory 58. A flip-flop 98 which normally in the reset state qualifies AND gate 103 through which pass clock pulses generated by the free running multivibrator clock 99. These clock pulses proceed through OR gate 105 into differentiators 106 and 108, the first of which produces a number one clock pulse when excited by a positive voltage step and the second of which produces an opposite phase clock pulse when excited by a decreasing voltage step. Thus the signal clock pulse which excites the differentiators results in a two phase clock pulse, clock one coming at the beginning of the period and clock two coming one-half period later. This type of clock pulse is required for the type of memory 118 used, which is a MOS FET register. The MOS FET shift register has the advantage of being low powered, low in cost, high in bit capacity per volume, and quite immune to noise. As an example of the high bit capacity per volume of this register it need only be stated that as many as 400 bits of storage are available in a single TO-5 package. The aforementioned two-phase clock pulses continually strobe the memory 118 so as to cause it to discharge its contents. The reset signal of flip-flop 98 additionally qualifies AND gate 115 so that the memory contents continually circulate therethrough and through OR gate 116 and back into the memory. A second clock 109 running at about 500 Hertz is counted down by counter 110 so as to generate alternate period signals of about 4 milliseconds length. AND gate 112 is thus qualified for alternate 4 millisecond periods so as to qualify AND gates 119 and 120 during these periods. Additionally, clock pulses from clock 99 strobe AND gates 119 and 120 synchronously with the discharge of information from memory 118 so that the information contained in the memory is not only recirculated, but is also transmitted whenever gates 119 and 120 are qualified by the transmitter. This 4 millisecond transmission period easily includes a complete message. The next 4 millisecond period during which gates 119 and 120 are closed so that the transmissions are dead, is used for receiving. During this receiving period the inhibiting signals applied on gates 90 and 91 which normally come from gate 112 are removed so that "1"s and "0"s from the receiver may enter therethrough. Flip-flops 92, 93 and 94 and AND gate 96 comprise a decoder to which digital "1"s are applied. Any digital "0" received by gate 91 will cause the decoder to be reset so that the flip-flops of the decoder will all generate digital "1" outputs only after seven consecutive digital "1"s are received. This, it will be remembered, signals the start of a message and is used to set flip-flop 98 which causes AND gate 115 to close so that the memory information no longer circulates therethrough. Additionally, AND gate 102 is qualified so that the received message passing through gates 90 and 91 and combined in gate 95 now passes therethrough and through gate 105 to the differentiators 106 and 108 to continue generation of the two phase clock pulse in synchronism with the received binary train. Additionally, the received message also proceeds through AND gate 113 which is now open and through OR gate 116 into the memory. During the time that an old message is being discharged from and the new message introduced into the memory, gates 119 and 120 are closed due to the removal of the flip-flop 98 reset signal from gate 112. The unit continues in this state, receiving and wiriting the new data into memory until the transmission ends. A counter writing which is connected to clock generator 99 is reset to zero by each received data bit which is applied through gate 95. Counter 100 can thus count no higher than one as long as a message is being received after a valid start of message word is received. When counter 100 counts to three, signifying that a message is no longer being received, it fires, thus resetting flip-flop 98 which thus again qualifies gate 115 to allow recirculation of the newly stored data. It also opens gate 112, thus restoring the normal transmitting and receiving periods governed by counter 110. If, however, during the receive mode the unit did not find a valid start of message word, no new data would be encoded into the memory, so that the memory will remain unchanged, and the transmit-receive cycle continued.

Reexamination of FIG. 1 will show that basically three types of track readers are required for a baggage sorting system of the type being described. A first type of track reader is fixed to recognize a predetermined baggage cart code. Examples of these are the readers **30*g*, 30*h* and 30*j* which are located at the entrance to airline terminals and 30*d* at an exit from an airline terminal which perform the function of switching baggage carts which are transmitting the proper airline code into (or out of) the proper terminal loops. Another type of fixed track reader is the reader 30b which is located at the entrance to the baggage claim recirculation area 33. Since baggage carts enter the recirculation area only when the passenger's trip is completed, this reader need only recognize a code signifying this fact. The other fixed ticket readers are 30*a*, 30*c*, 30*e* and 30*f*. These latter readers need only recognize that portion of the code which identifies the loop they guard. For example, track reader 30*e* would be set to recognize a code which identifies loop 26**, so that a baggage cart whose escort memory includes a code identifying this loop is switched into the loop.

A second type of track reader is the programmable type which can be set from a remote location to recognize different portions of the baggage ticket message. An example of this type of reader is those track readers 32 which are located at the entrance to the pre-flight holding spurs **31*a*, 31*b*, 31*c* and 31*d* and on the loops 24 and 25** at flight line. These readers identify the flight number and thus must be programmed with current flight number information.

The third type of track reader is master claim reader 35 which controls the exit from the baggage claim recirculation area 33. This reader must be programmed from the various system access areas to identify the baggage cart being called for and additionally, it must be able to recode the escort memory of the baggage cart identified with the code of the particular access area to which the baggage cart should now proceed.

Figure 8:
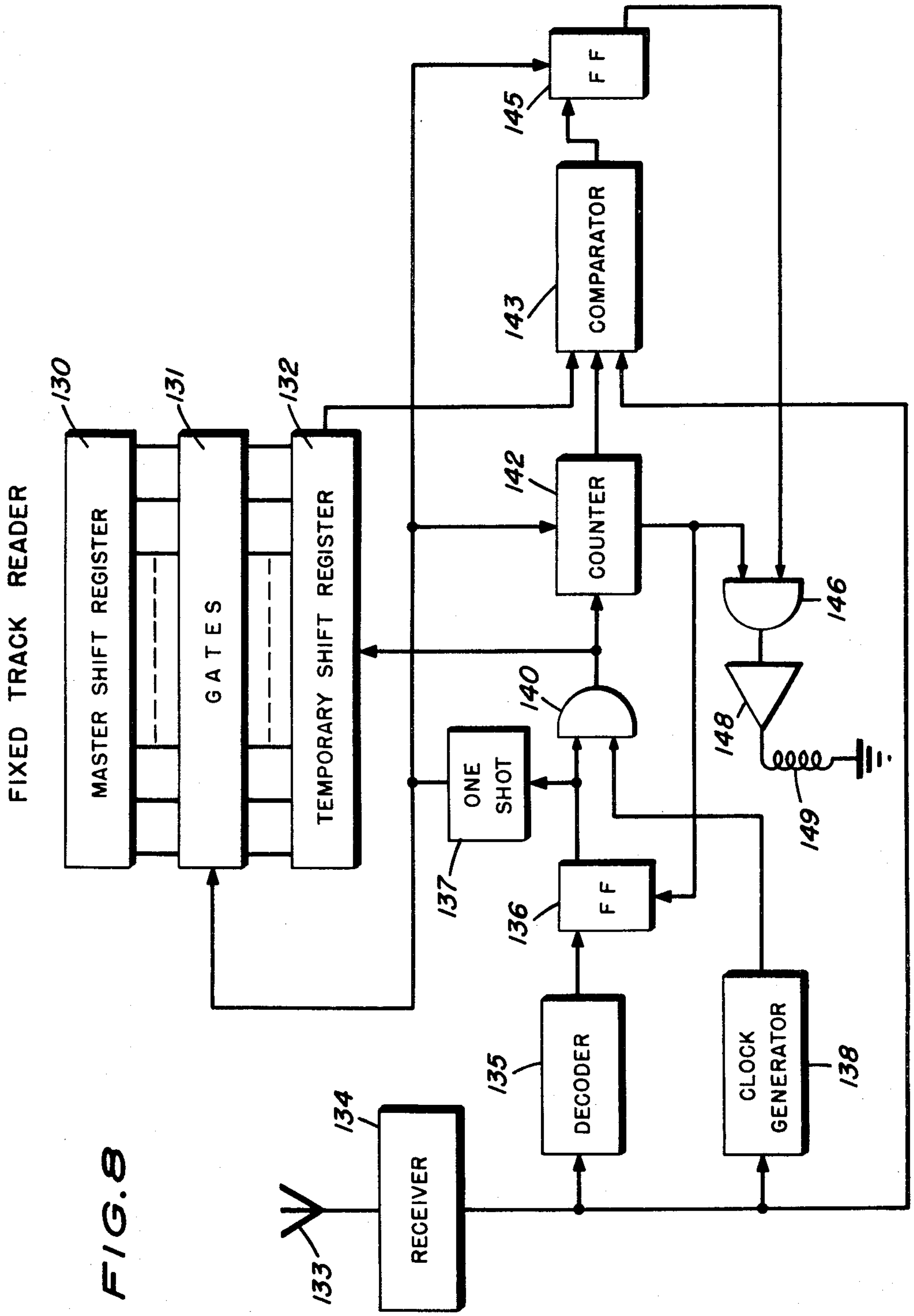
FIG. 8 is a block diagram of a fixed track reader.

Referring to FIG. 8 which is a block diagram of a fixed track reader, a master shift register 130 is preset with the code this particular reader is to identify. As the baggage cart approaches the cart's transmitted message is received by antenna 133 and demodulated in receiver 134. If a start of message word is received by decoder 135, which is suitably the counter and gate previously described, flip-flop 136 is triggered into the set state, thus triggering one shot 137 and qualifying AND gate 140. The one shot output pulse resets counter 142 and flip-flop 145 and qualifies gates 131 which sample the information stored in master shift register 130 so as to reproduce it in temporary shift register 132. The demodulated received message is also applied to clock generator 138 which, in response thereto, generates clock pulses which proceed through qualified gate 140 and then into temporary shift register 132 to strobe this register, causing it to discharge its contents into comparator 143. The clock pulses are also applied to counter 142 which qualifies comparator 143 only during that portion of the message the reader has been set to identify. The received message is also applied to comparator 143 for comparison with the stored message. If the portions of the receive and stored messages which are compared agree bit by bit no error signal is generated by the comparator so that flip-flop 145 remains in the reset state and gate 146 remains qualified. At the completion of the comparison period as determined by the counter 142 (since the message is of predetermined length), a completion of message signal is supplied by this counter to reset flip-flop 136 and gate 146. Since no error signal has been generated in comparator 143, the completion of message signal will pass through gate 146 to be amplified in amplifier 148 so as to energize winding 149 which controls the track switch.

If the stored and received messages do not correspond exactly in that portion of the message being identified, comparator 143 will generate an error signal which forces flip-flop 145 into the set state. Thus, the qualification signal is removed from gate 146 so that at the completion of the message as determined by counter 142 gate 146 will be found closed so that winding 149 cannot be energized. The baggage cart whose escort memory is being read will thus proceed straight along the track and will not be switched into the loop guarded by this reader.

Figure 9:
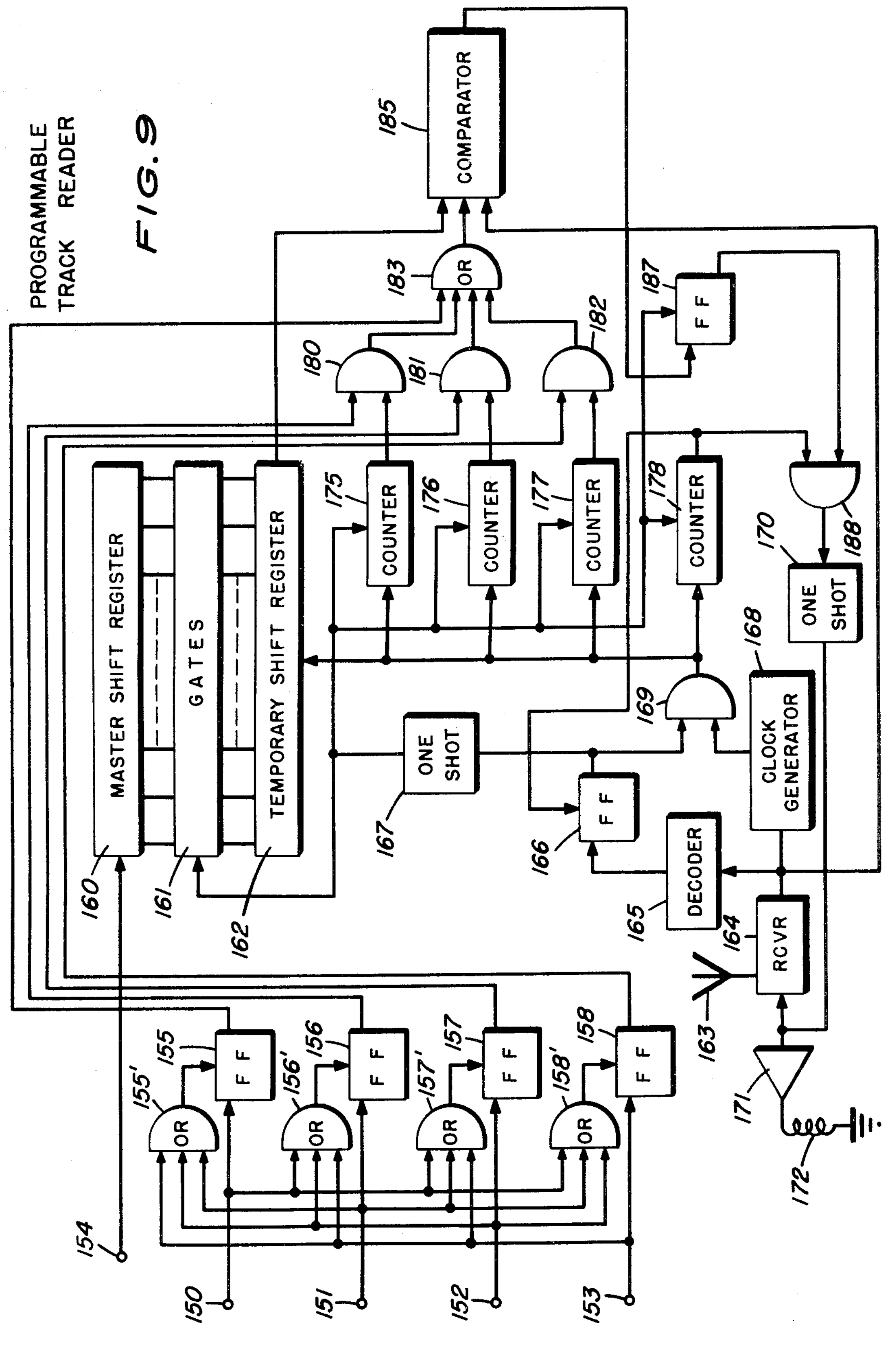
FIG. 9 is a block diagram of a programmable track reader.

Referring now to FIG. 9, which is a block diagram of a programable track reader, an identification code is received on terminal 154, suitably via a ground wire with this identification code being stored in master shift register 160. The means for generating this ground wire transmitted identification code may be identical to the optical reader and encoder described in the aforemented Pat. application Ser. No. 724,855. Actually it need only be known that a baggage handling message comprised of a train of binary bits is received on terminal 154. Additionally, a pulse is transmitted over a second wire to one of the input terminals 150, 151, 152 or 153. This pulse programs the reader to identify either all or only a certain section of the message. This will be made obvious as the description of the reader continues. Assume now that a message has been received over the ground wire and stored in master shift register 160 with any message previously stored therein being obliterated thereby and, additionally, a pulse is received at terminal 152 thus setting flip-flop 157 and resetting flip-flops 155, 156 and 158 through OR gates 155′, 156′ and 158′ respectively. In the set state flip-flop 157 set qualifies AND gate 181 while gates 180 and 182 remain unqualified. When a baggage cart thereafter approaches this reader, the message stored in the baggage cart escort memory and transmitted therefrom is receiver on antenna 163 and demodulated by received 164. The demodulated message is applied to the decoder 165 which, if it recognizes the start of message word, triggers flip-flop 166 into the set state thus qualifying AND gate 169 and triggering one shot 167. The one shot pulse resets counters 175 to 178 and flip-flop 187 and simultaneously qualifies gates 161 so as to cause the information stored in register 160 to be sampled and transferred into temporary shift register 162. The demodulated received message is also applied to clock generator 168 which generates clock pulses in accordance therewith which generates clock pulses in accordance therewith which proceed through AND gate 169 to counter 178 into counter 178 and additionally into counters 175 to 177 and temporary shift register 162 which thus begins to discharge its contents to comparator 185. The received and demodulated message is also applied to comparator 185. Comparator 185 is energized only in accordance with qualification signals received from counter 176 which proceed through qualified AND gate 181 and OR gate 183, gates 180 and 182 being unqualified as previously explained. Counter 176 includes counting circuits which start counting simultaneously with the movement of information out of temporary shift register 162 but the counter produces an output only during that portion of the message which is to be identified. If the received message and the stored message do not correspond bit by bit in that portion of the message which is being identified, comparator 185 generates an error signal which triggers flip-flop 187 into the set state. AND gate 188 qualification signal which is received when flip-flop 187 is reset is thus removed, so that at the completion of the message as determined by counter 178 the completion of message signal which is generated by this counter finds gate 188 closed. The end of message signal generated by counter 178 is also used to reset flip-flop 166.

If, however, the stored and received messages compare exactly bit by bit in that portion of the message being identified, comparator 185 generates no error signal so that flip-flop 187 will remain in the reset state and gate 188 remains qualified. At the completion of the message as determined by counter 178, the end of message signal generated by this counter proceeds through gate 188 and triggers one shot 170, the output of which is amplified by amplifier 171 so as to energize winding 172 which controls the track switch, thus switching the baggage loop controlled by this track reader. The one shot 170 output pulse also temporarily disables receiver 164 so as to prevent further communication between the baggage cart, which has now been identified, and the track reader.

Figure 10:
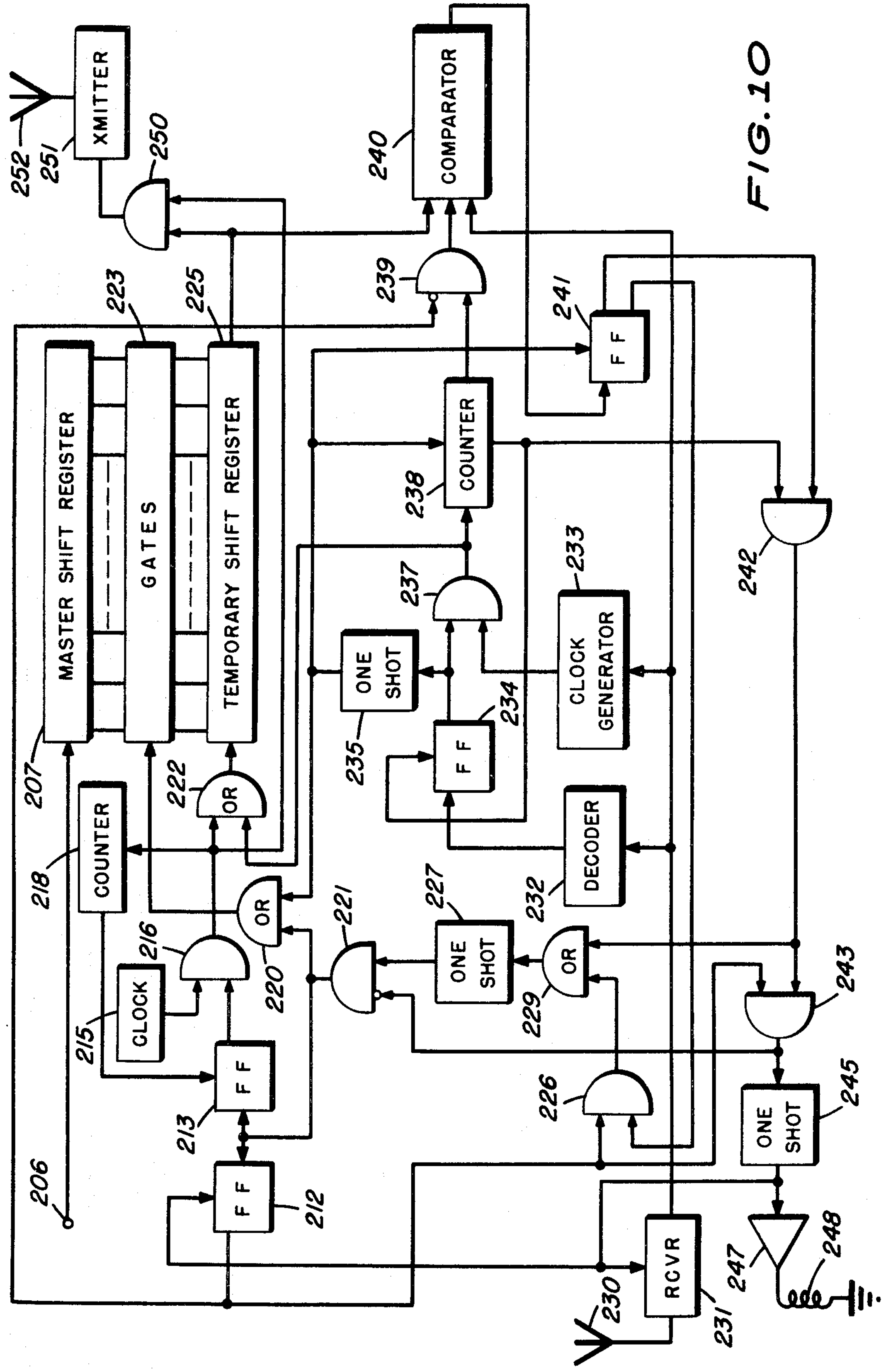
FIG. 10 is a block diagram of a master claim reader.

Referring now to FIG. 10 which is a block diagram of a master claim reader, which can identify not only various portions of codes and various different codes but can also reprogram the escort memory of an identified baggage cart. This type of reader is necessary, as has been explained, at the exit of the baggage claim recirculation area in order to identify the baggage cart being called for and to program it with information which will allow it to proceed to the proper baggage handling system access area. As before, a message to be identified is received via ground wire on terminal 206 from a baggage system access point to which the baggage cart is to proceed and stored in master shift register 207. Generally, in this track reader only that portion of the message identifying the baggage claim number need be identified, thus the reader need only be programmed with this number; however, the message received on terminal 206 will contain in addition to the baggage claim number, the code of the access area to which the cart is to proceed. This code is added automatically to the message at the baggage access area, as previously described, before transmission to the master claim reader. Assume that there is now stored in register 207 a message containing a baggage claim code which is to be identified and the code of the baggage system access area to which the baggage is to be delivered. A baggage cart approaching the reader transmits the message stored in its escort memory to antenna 230 from whence the message is demodulated in receiver 231 and applied to decoder 232. When the start of message word is received the decoder triggers flip-flop 234 into the set state thus qualifying AND gate 237 and triggering one shot 235. The one shot output pulse resets counter 238 and flip-flop 241 and additionally is applied through OR gate 220 to qualify gates 223 which thus sample and transfer the message stored in register 207 into register 225. The received message is also applied to clock generator 233 which generates clock pulses in response thereto which are applied through AND gate 237 to counter 238 and also through OR gate 222 to strobe register 225, thus causing this register to empty its contents into comparator 240. AND gate 250 is closed at this time so that the temporary shift register contents cannot pass through this latter gate. The received message is also simultaneously applied to the comparator which is energized to compare that portion of the message identifying the baggage claim number in accordance with counter 238 signals applied through AND gate 239. If an error signal is generated, flip-flop 241 is triggered into the set state, thus applying a signal as one input to AND gate 226. Since, however, flip-flop 212 is in a normal reset state it is generating no output so that gate 226 is not qualified and the set signal from flip-flop 241 cannot pass therethrough. Additionally, with flip-flop 241 in the set state. AND gate 242 is not qualified so that an end of message signal generated by counter 238 and applied to this gate may not pass therethrough. The end of message signal generated by counter 238 is applied, however, to reset flip-flop 234, thus placing the system in condition to receive the next message on antenna 230.

If, however, baggage claim words of the stored and received messages compare exactly bit by bit, comparator 240 generates no error signal so that flip-flop 241 remains in the reset state. The end of message signal generated by counter 238 now not only resets flip-flop 234 so as to enable the system to receive the next message at antenna 230, but also it now passes through qualified AND gate 242 and OR gate 229 so as to trigger one shot 227. The gate 242 output signal however, may not pass through AND gate 243 which is closed since flip-flop 212 is in the reset state. The one shot 227 output pulse passes through AND gate 221 and OR gate 220 and qualifies gates 223 to once again enter into register 225 the information stored in register 207. The one shot 227 output pulse is also used to set flip-flops 212 and 213. The flip-flop 213 set output signal qualifies AND gate 216 so that the free-running clock 215 pulses may pass therethrough and through OR gate 222 so as to strobe register 225 to cause it to discharge its contents into AND gate 250. This latter gate is qualified by the clock pulses generated by clock 215 so that it is qualified in synchronization with the bits emerging from register 225, which bits pass through the gate to transmitter 251 wherein the information is modulated and transmitted via antenna 252 to the baggage cart just identified. The message thus transmitted to the baggage cart will, of course, include a start of message word which, it will be remembered, upon receipt by the baggage cart causes the baggage cart to cease transmitting and assume a receive mode so that the information stored in its escort memory is discharged and the new message is stored therein. When the message which has been stored in register 225 has been completely transmitted to the baggage cart, which fact is determined by counter 218 which has accumulated the clock pulses which have strobed register 225, the counter generates a completion of message signal which is used to reset flip-flop 213 thus closing gate 216.

When the baggage cart once again resumes the transmit mode it will transmit the message newly stored, with the message being received on antenna 230 and demodulated by receiver 231 in the manner previously described. When the start of message word is received decoder 232 generates a signal which triggers flip-flop 234 into the set state thereby triggering one shot 235 to reset counter 238 and flip-flop 241, with the one shot output pulse additionally passing through OR gate 220 so as to qualify gates 223, once more transferring the information stored in register 207 into register 225. The received message is also applied to clock generator 233 which generates clock pulses in response thereto which are applied through AND gate 237 and OR gate 222 to strobe register 225, with the information contained therein discharging into comparator 240. The received message is also applied to comparator 240. However, at this time gate 239 is inhibited by the flip-flop 212 signal so that the counter 238 signals may not be used to program the comparator. The comparator will thus compare the entire message received with the entire message stored in register 225, the comparator generating an error signal if perfect correlation is not observed. The error signal triggers flip-flop 241 into the set state thus removing the gate 242 qualification signal so that at the completion of the message as determined by counter 238 the end of message signal generated by this counter may not pass through gate 242. The flip-flop 241 set signal passes through qualified AND gate 226 and OR gate 229 so as to once again trigger one shot 227 thus causing the reader to repeat the transmission of the information stored in register 207 to the escort memory of the baggage cart.

If the message received from the baggage cart correlates exactly bit by bit with the message stored in register 207, comparator 240 generates no error signal so that flip-flop 241 remains in the reset state thus qualifying gate 242. At the end of the message, as determined by counter 238, the end of message signal generated by this counter passes through gate 242 and through gate 243, which is now qualified by the flip-flop 212 signal, so as to trigger one shot 245. The one shot output pulse temporarily disables receiver 231 to prevent further communication between the baggage cart and the track reader and additionally is used to reset flip-flop 212. The one shot output pulse is also amplified in amplifier 247 to be used to energize winding 248 which controls the track switch, thus switching the identified and reprogrammed baggage cart out of the baggage claim recirculation area so that it may proceed to the proper baggage pick-up area as identified by information now contained in the escort memory. The output signal from gate 243 is also applied so as to inhibit gate 221, thus preventing activation of the reader's reprogramming circuitry at this time.

Although in the description of various of the system elements separate transmitting and receiving antennas are shown, it should be obvious that a single, shared antenna may be used, proper coupling techniques being well within the present state of the art. It should also be obvious to one skilled in the art that similar material handling systems can be assembled using the principles taught by this invention; therefore, I do not wish to limit my invention to the specific form shown and accordingly claim as my invention the subject matter including modifications and alterations thereof encompassed by the true scope and spirit of the appended claims.

I claim:

1. A master reader for reading and reprogramming a remote memory including a memory receiving means, said memory having the characteristic ability to store a message including at least a first unique word, a second unique word identifying said memory and a third word, sample and transmit said message and reprogram itself upon receipt of said first unique word at said memory receiving means with a subsequently received message, said memory containing before being reprogrammed a first message including at least said first and second words but not said third word, said master reader comprising:

master storage means for storing a second message including at least said first, second and third unique words;

master receiving means for receiving messages transmitted by said memory and for generating a start signal upon receipt of said first unique word;

comparator means for comparing a message applied thereto with said second message during a comparison period and for generating a reprogramming signal when said messages compare properly;

first means responsive to said start signal for applying said received first message to said comparator means;

second means responsive to said start signal for sampling said second message stored in said master storage means and applying said sampled second message to said comparator means;

means responsive to said received first signal for disabling said comparator means during predetermined portions of said comparison period; and, transmitter means responsive to said reprogramming signal for transmitting said second message to said memory.

2. A master reader as recited in claim 1 wherein said first and second messages comprise trains of electrical binary bits arranged in a predetermined order and said master storage means comprises a shift register.

3. A master reader as recited in claim 2 wherein said second means comprises:

a temporary shift register connected to discharge the contents in a predetermined order into said comparator means when strobed for storing said sampled second message;

a plurality of gates qualified by said start signal for sampling said second message as contained in said master storage means into said temporary shift register; and, strobing means responsive to said received first signal for generating strobing pulses and applying said strobing pulses to said temporary shift register.

* * * * *